United States Patent [19]

Paschke et al.

[11] Patent Number: 5,264,544

[45] Date of Patent: Nov. 23, 1993

[54] AMORPHOUS POLYAMIDE COMPOSITION FROM NEOPENTYL DIAMINE

[75] Inventors: Edward E. Paschke, Wheaton; Wassily Poppe, Lombard; David P. Sinclair, Winfield, all of Ill.

[73] Assignee: Amoco Corporation, Chicago, Ill.

[21] Appl. No.: 913,870

[22] Filed: Jul. 15, 1992

Related U.S. Application Data

[63] Continuation of Ser. No. 730,102, Jul. 15, 1992, abandoned, which is a continuation of Ser. No. 485,623, Feb. 27, 1990, Pat. No. 5,081,223.

[51] Int. Cl.$^5$ .............................................. C08G 69/26
[52] U.S. Cl. ..................................... 528/349; 524/606; 525/420; 525/432; 528/26; 528/183; 528/190; 528/220; 528/337; 528/338; 528/339; 528/340; 528/344; 528/347
[58] Field of Search ............... 528/349, 26, 183, 190, 528/220, 337, 338, 339, 340, 344, 347; 524/606; 525/420, 432

[56] References Cited

U.S. PATENT DOCUMENTS 5,081,223 1/1992 Paschke et al. .................... 528/349

OTHER PUBLICATIONS

Stephens, Journal of Polymer Science, vol. 40 (1959), pp. 359-366.

*Primary Examiner*—Harold D. Anderson
*Attorney, Agent, or Firm*—Richard J. Schlott; Stephen L. Hensley; Frank J. Sroka

[57] ABSTRACT

Amorphous polyamide compositions are provided which are transparent and have improved glass transition and thermal decomposition temperatures. The polyamide compositions of the present invention can be prepared as the polymeric condensation product of a diamine component comprising neopentyldiamine, and a diacid component comprising an aromatic dicarboxylic acid.

13 Claims, No Drawings

AMORPHOUS POLYAMIDE COMPOSITION FROM NEOPENTYL DIAMINE

This is a continuation of application Ser. No. 07/730,102, filed Jul. 15, 1992, abandoned, which in turn is a continuation of 485,623 filed Feb. 27, 1990, now U.S. Pat. No. 5,081,223.

This invention relates to polyamide compositions and, more particularly, to novel transparent amorphous polyamides which have high glass transition temperatures (Tg) and high decomposition temperatures (Td), as well as blends thereof.

BACKGROUND OF THE INVENTION

Amorphous polyamides are generally suitable for the manufacture of sheets, strips, tubes, and injection-molded articles. However, many amorphous polyamides have relatively low glass transition temperatures and low decomposition temperatures. Accordingly, products made from these polyamides cannot be used in high temperature environments.

Numerous crystalline polyamides are known to have high Td values, for example, the polycondensation product of hexamethylenediamine and either adipic acid or dodecane dicarboxylic acid. However, many crystalline polyamides also have low Tg values. Further, these crystalline polyamides are not transparent. If a transparent polyamide is desired, the polyamide must be amorphous rather than crystalline.

Various amorphous polyamide compositions are well known. An example of an amorphous polyamide composition, disclosed in U.S. Pat. Nos. 2,715,620 and 2,742,496, is a polyamide of isophthalic acid and hexamethylenediamine. These polyamides are reported to have a low dimensional stability at elevated temperatures. U.S. Pat. No. 4,250,297 proposed to overcome this difficulty by replacing part of the hexamethylenediamine with an isomer mixture of 2,2,4- and 2,4,4-trimethylhexamethylenediamine.

Amorphous polyamides based on mixtures of terephthalic acid and isophthalic acid or their derivatives and hexamethylenediamine also are known, as reported in U.S. Pat. Nos. 3,379,695 and 3,475,387. While such compositions are said to exhibit minor improvements in heat deflection temperatures relative to the isophthalic acid and hexamethylenediamine polyamides, transparency of products prepared from these compositions suffers and crystallization of the polymer can occur during use of the products at elevated temperatures if the mole ratio of isophthalic acid to terephthalic acid is too low.

U.S. Pat. No 3,145,193 discloses a transparent polyamide based on the polycondensation product of alkyl-substituted polymethylene diamines having at least seven methylene groups and a mixture of terephthalic acid with 5–10% isophthalic acid.

Yu et al., J. of Polymer Science, XLII, 249–257 (1960), investigated the homoadipamide and copolyamide of adipic and terephthalic acids with 4,4-dimethyl-1,7-heptanediamine. The polymer was reported to be transparent. The authors ascribed the transparent attribute to the chain packing interference contributed by the methyl groups on the diamine.

J. G. Dolden, Polymer, 17 (October), 875–892 (1976), proposed that the crystallinity found in polyamides prepared from diacids and diamines is the result of the ability of the linear chains to pack in a regular crystal lattice and of the hydrogen bonding which exists between interchain amide links. The author further noted that the introduction of asymmetry by introducing ethyl or higher substituents along the asymmetric chain or the attachment of more than one methyl group to the same in-chain carbon member acts to prevent crystallization.

U.S. Pat. Nos. 4,451,642 and 4,564,705 disclose polyamides derived from aromatic bis(neopentylamine). These references also disclose that polyamides derived from diamines which contain no hydrogen atoms in the position beta to nitrogen are superior in thermal stability to those diamines which contain such hydrogens. These references also mention that neopentyldiamine is known and that polyamides have been made from this diamine. There is, however, no disclosure of any particular neopentyldiamine polyamide or properties thereof. There is no teaching that the compositions disclosed in these patents have a high Td, nor any suggestion that the Tg can be elevated by means of a simple aliphatic diamine. Further, U.S. Pat. No. 4,831,108 describes a polycondensation process wherein an attempted polycondensation of neopentyldiamine and a 40/60 mole ratio of terephthalic acid/isophthalic acid resulted in a discolored product having a reported inherent viscosity of 0.07 dL/g. A polyamide having an inherent viscosity of less than 0.40 dL/g has insufficient mechanical properties to produce a useful product.

Other attempts have been made to produce amorphous polyamides. U.S. Pat. No. 2,766,222 discloses a polymer of meta-xylylene diamine and isophthalic acid. U.S. Pat. No. 3,294,758 discloses replacement of a portion of substituted polymethylene diamine with an unbranched, unsubstituted polymethylene diamine of the same chain length in a polycondensation with terephthalic acid and/or isophthalic acid. U.S. Pat. No. 3,382,216 discloses terephthalic acid-containing polyamides having specific proportions of 2-methylpentamethylenediamine.

Amorphous copolyamides are disclosed in U.S. Pat. No. 4,232,145. This reference discloses a diaminodicyclohexylalkane or a mixture of diaminodicyclohexylalkane with a polyamide-forming aromatic dicarboxylic acid of more than 9 carbon atoms and an omega-amino-acid or an aliphaic dicarboxylic acid-diamine. The Tg of the copolymer is increased by increasing the proportion of omega-amino-acid or aliphatic dicarboxylic acid-diamine mixture.

While these patents and publications disclose various amorphous polyamides and properties thereof, there remains a need for amorphous polyamide compositions having a desirable balance of properties, including high glass transition and decomposition temperatures, such that articles fabricated from the amorphous compositions can be used in high temperature environments.

Accordingly, it is an object of the present invention to provide improved amorphous polyamide compositions. Another object of the present invention is to provide an amorphous polyamide composition which exhibits an improved glass transition temperature. Another object of the present invention is to provide an amorphous polyamide composition which exhibits improved thermal decomposition temperature. A further object of the present invention is to provide a transparent polyamide. A still further object of the present invention is to provide copolyamide compositions having advantageous properties. These and other objects and advantages of the present invention will be apparent to those skilled in the art from the following description.

DESCRIPTION OF THE INVENTION

The objects of this invention can be attained by providing amorphous polyamide compositions comprising recurring units corresponding to formula I

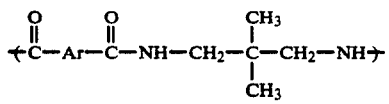

wherein Ar is an aromatic moiety containing from 6 to 18 carbon atoms.

The improved polyamide compositions of the present invention have both high Tg and Td, with the Tg as high as 190° C. and Td as high as 378° C. For example, a terephthalic acid and neopentyldiamine polyamide (TA-NPDA) displayed a Tg of 188° C., and the temperature at 1% weight loss (Td) was 378° C. (see Example 11 below). An isophthalic acid and neopentyldiamine polyamide (IA-NPDA) displayed a Tg of 184° C. (see Example 10 below). The Tg of a 60/40 TA/IA-NPDA polyamide was 190° C., and the temperature at 1% weight loss (Td) was 369° C. (see Example 9 below).

The polyamides of the present invention are amorphous polymers even where crystalline polymers might be expected. For example, TA-NPDA polyamides (see Example 11 below) and copolyamides of terephthalic acid/adipic acid and neopentyldiamine (TA/AA-NPDA) were amorphous while the polycondensation product of HMDA and either adipic acid or terephthalic acid are known to be crystalline polyamides. Further, the compositions are normally transparent, thus indicating their substantially amorphous character. In addition, the compositions of the present invention have inherent viscosities of greater than 0.40 dL/g.

Briefly, in one aspect of the present invention the compositions of this invention are amorphous polyamides comprising recurring units corresponding to formula I above. In another aspect of the present invention, the polyamides comprise recurring units corresponding to formula I above and, in addition, recurring units of formula II

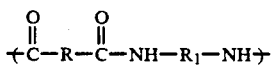

wherein R and $R_1$ are independently an aliphatic, aromatic, arylaliphatic, or cycloaliphatic moiety comprising a divalent radical containing from 2 to 20 carbon atoms. Further, R and $R_1$ can be unsubstituted or substituted, for example, with halide or lower alkyl groups.

As compared to the polyamides corresponding to formula II, the compositions according to this aspect of the invention exhibit improved Tg and Td. In other words, the addition of recurring units of the formula I to compositions comprising recurring units of the formula II will produce a copolymer having improved Tg and Td.

In greater detail, the aromatic moiety, Ar in Formula I, is characterized by a single aromatic ring or by two or more such rings which are fused together or are joined by one or more stable linkages, such as a covalent carbon-carbon bond, oxy, sulfonyl, carbonyl, alkylene, and the like. The aromatic moiety can include divalent radicals of benzene, naphthalene, phenanthrene, anthracene, and the like. Further, the aromatic rings can be unsubstituted or substituted, for example, with one or more halide or lower alkyl groups.

Specific examples of suitable Ar moieties include six to ten carbon substituted and unsubstituted aromatic moieties of the following structures:

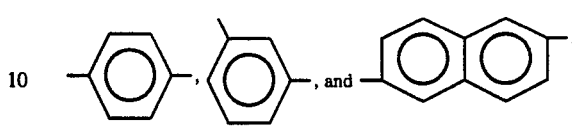

Best results have been attained with polyamides in which Ar is

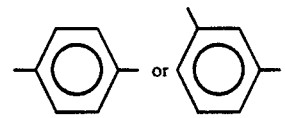

or a combination thereof.

Aliphatic moieties suitable as R and $R_1$ in Formula II are characterized by a straight or branched-chain hydrocarbon and can include methylene ($CH_2$) repeating units, for example, ethylene, propylene, tetramethylene, hexamethylene, octamethylene, nonamethylene, decamethylene, dodecamethylene, and the like. Further, the aliphatic moiety can be unsubstituted or substituted with one or more halide or lower alkyl groups such as, for example, 2,2,4-trimethylhexamethylene, 2,2-dimethylpropylene, and the like.

Arylaliphatic moieties suitable as R and $R_1$ in Formula II are characterized by a hydrocarbon that has both aryl and aliphatic structures in the same moiety. For example, in the arylaliphatic moiety xylylene the aryl portion of the structure is a divalent radical of benzene and the aliphatic portion of the structure comprises methylene units. The arylaliphatic moiety can be unsubstituted or substituted, for example, with one or more halide or lower alkyl groups.

Suitable cycloaliphatic moieties are characterized by a hydrocarbon having one or more closed rings, it may be mono-, bi-, tri-, or polycyclic depending on the number of rings present. An example is a cyclohexyl moiety. Further, the cycloaliphatic moiety can be unsubstituted or substituted, for example, with one or more halide or lower alkyl groups.

The polyamide compositions of the present invention can be prepared as the polymeric condensation product of a diamine component comprising neopentyldiamine, and a diacid component comprising at least one aromatic dicarboxylic acid.

Suitable aromatic diacids for preparation of the invented compositions include those aromatic diacids having from 8 to 20 carbon atoms, for example, terephthalic acid, isophthalic acid, 2,6-naphthalenedicarboxylic acid, 5-t-butylisophthalic acid, the dimethyl ester of 2,6-naphthalenedicarboxylic acid, and the like. Also included are dicarboxylic acids with the structure

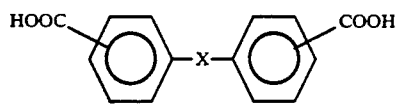

where X can be O, SO$_2$, alkylidine such as (CH$_3$)$_2$C, and CO. The aromatic structures can be substituted with alkyl groups containing from 1 to 4 carbon atoms, and halogen. The preferred aromatic dicarboxylic acids are terephthalic acid, isophthalic acid, and combinations thereof.

Suitable aliphatic diacids for the preparation of the inventive copolyamides are those having from 2 to 22 carbon atoms, for example, adipic acid, glutaric acid, pimelic acid, suberic acid, azelaic acid, sebacic acid, decanedioic acid, undecanedioic acid, dodecanedioic acid, octadecanedioic acid, and the like. Also included are alkyl-substituted aliphatic dicarboxylic acids and cycloaliphatic dicarboxylic acids such as cyclohexanedicarboxylic acids, and the like.

Suitable aliphatic, arylaliphatic, or cycloaliphatic diamines for the preparation of the inventive copolyamides include neopentyldiamine (2,2-dimethylpropylenediamine), ethylenediamine, propylenediamine, pentamethylenediamine, tetramethylenediamine, hexamethylenediamine, octamethylenediamine, nonamethylenediamine, decamethylenediamine, dodecamethylenediamine, 4,4'-diaminodicyclohexylethane, xylylenediamine, para- and metaxylylenediamine, bis-(aminomethyl)cyclohexane, and the like. Suitable alkyl-substituted aliphatic diamines include 2,2,4 and 2,4,4-trimethylhexamethylenediamines, and the like. The preferred aliphatic diamine is hexamethylenediamine and neopentyldiamine.

Suitable aromatic diamines for preparation of the invented copolyamides include para- and meta-phenylenediamine, para-toluenediamine, 2,4-toluenediamine, 2,6-toluenediamine, 3,5-toluenediamine, oxybis-(aniline), thiobis(aniline), sulfonylbis(aniline), diaminobenzophenone, methylenebis(aniline), benzidine, 1,5-diaminonaphthalene, oxybis(2-methylaniline), thiobis(2-methylaniline), 2,2'-naphthalene diamine, 2,4'-naphthalenediamine, 2,2'-biphenylenediamine, 3,3'-biphenylenediamine, 4,4'-biphenylenediamine, 3,3'-dichlorobenzene, ethylenedianiline(4,4'-diaminophenylethane), ketodianiline, 3,3'-diaminodiphenyl sulfide, 4,4'-diaminodiphenyl sulfone, 3,3'-diaminodiphenyl sulfone, hexafluoroisopropylidene-bis(4-phenylamine), 4,4'-diaminodiphenyl methane, 2,6-diaminopyridine, bis(4-aminophenyl)diethyl silane, bis(4-aminophenyl)ethyl phosphine oxide, bis(4-aminophenyl)-N-phenylamine, bis(4-aminophenyl)-N-methylamine, 3,3'-dimethyl-4,4'-diaminobiphenyl, para-bis(2-methyl-4-aminophenyl)benzene, and the like.

Units corresponding to the formula I are present in the invented copolyamides in any suitable proportion. Generally, the range is such that the mole ratio of components of Formula I to components of Formula II is from about 99:1 to about 1:99. However, the polymer attribute, such as toughness, that is required for a particular end use will determine the mole ratio of the components necessary to achieve that attribute. In other words, the preferred mole ratio will vary depending on the desired polymer attribute. Still, copolyamide compositions comprising, for example, poly(hexamethylene isophthalamide) or poly(hexamethylene terephthalamide) units and even minor proportions of the components of Formula I of the present invention provide an increase in Tg relative to the compositions lacking in components of Formula I.

Generally, in preparation of the invented compositions, the diamine and diacids are present in approximately equivalent amounts so that the resulting polyamide has the maximum molecular weight. However, by using an excess of diamine or diacid in the reaction mixture, the chain length of the product can be adjusted. Further, the chain length can be restricted by adding a predetermined quantity of a monoamine or a monocarboxylic acid or other suitable chain-terminating agent to the reaction mixture. Preferably, the polymer chain is terminated with acetic acid or benzoic acid.

The polyamides can be prepared from the salts of the diacids and diamines by conventional melt condensation procedures. In this case, an aqueous solution containing a mixture of the appropriate salt or salts and the diamine is heated under conditions of controlled time, temperature, and pressure to remove the water and effect polymerization. The temperature and pressure conditions will vary according to the particular polymer composition being prepared. However, it is preferred that the temperature and pressure conditions are arranged to avoid decomposition of the neopentyldiamine monomer.

Another method for the preparation of the polyamides of the present invention is contact, or interfacial, polymerization. In this case, an activated derivative of the diacid components, such as diacyl chlorides, are dissolved in an organic solvent which is immiscible with water. The diamine together with an acid acceptor, such as potassium hydroxide, is dissolved in water. The two solutions are brought into contact, usually with vigorous stirring. Solid polymer forms at the interface between the two solutions with the potassium hydroxide neutralizing the hydrogen chloride formed as a by-product of the polymerization. The reaction is generally carried out at a temperature that is below the boiling point of the most volatile solvent, preferably at, or below, room temperature. This method is described in detail in Wittbecker et al., Interfacial Polycondensation. I., Journal of Polymer Science, XL, 289 (1959) incorporated herein by reference.

In somewhat greater detail, typically neopentyldiamine (NPDA) and base, such as potassium hydroxide (KOH), are stirred with distilled water. If one or more additional diamines is to be used in the polymerization, a second diamine may be added at this point, such as hexamethylenediamine (HMDA). A solution of acid chloride, which can contain, for example, one or both of terephthaloyl dichloride (TACl) and isophthaloyl dichloride (IACl), is added, and the polyamide is allowed to form. The solid is isolated and washed to remove any chloride salts that may be present from the reaction. The resulting polymer can then be dried, for example, in a vacuum oven.

In general, no added catalysts are required to produce the polyamides of the present invention. However, catalysts may be added to provide certain advantages, for example, to increase the speed of reaction. Examples of such catalysts are metal phosphite and hypophosphite salts, for example, sodium hypophosphite.

Additives which are conventionally used in the manufacture of polyamides can be added to the polycondensation mixture before, during, or after the polycondensation process. Although transparency may be reduced by the inclusion of some of the additives, in some end uses the benefits of, for example, reinforcement, may outweigh the reduction in transparency. Many of these additives can also be rolled into or extruded with the polymer by extrusion compounding or other suitable methods.

Suitable additives are, for example, light and heat stabilizers, which can include aromatic amines, such as diphenylamine; phosphoric compounds, such as phosphoric acid; and/or soluble metal compounds, including copper or manganese; colorants; optical brighteners; plasticizers; mold-release agents; flame-retardant agents; reinforcing fibers, such as glass, graphite, boron, ceramic, or aramid; and mineral fillers. These additives can constitute up to about 65 weight percent of the polyamide. Generally, additives are in an amount which is sufficient to provide, for example reinforcement, without affecting the processability of the polymer. For example, glass fibers used as reinforcement are generally included in the range of about 10 to about 50 weight percent.

The polyamide composition of the present invention can be mixed (by extrusion compounding or other suitable methods) with one or more other thermoplastic polymers to form blends. The polymer attribute, such as toughness, that is required for a particular end use will determine the weight ratio of the components of the blend that are necessary to achieve that attribute. In other words, the preferred weight ratio will vary depending on the desired polymer attribute. Broadly, from 1 to 99 weight percent of the polyamide of the present invention is used to form the blend.

Examples of other thermoplastic polymers include Nylon 6/6 (the polycondensation product of adipic acid and hexamethylenediamine), Selar ® polyamides (a specific example is Selar ® PA3426, which is believed to be the polycondensation product of 30/70 TA/IA and hexamethylenediamine and is available from E.I. DuPont de Nemours & Company, Wilmington, Del.), Trogamid T ® (the polycondensation product of terephthalic acid and a mixture of 2,2,4-trimethylhexamethylenediamine and 2,4,4-trimethylhexamethylenediamine which is available from Dymanit Nobel), and PET (polyethylene terephthalate). Most preferred are Selar polyamides, Nylon 6/6, and Trogamid T, because they form miscible blends with the compounds of the present invention.

Such polyamide compositions are well-suited for use in the manufacture of a wide range of fabricated articles, such as films, sheets, laminates, fibers, and molded articles. Solutions of the polyamide compositions can be cast to form thin films. The polyamides of the present invention can be melt fabricated, for example, into film and injection molded into parts.

The foregoing may be better understood by reference to the following examples which are provided for illustration and not limitation of the practice of the invention.

EXAMPLES

In the following examples, the thermal decomposition temperature (Td) of the polymer was determined as the temperature at which 1% weight loss occurred and was determined by using a Thermal Gravimetric Analyzer (TGA) attachment with a model 9900 thermal analyzer (available from E.I. DuPont de Nemours & Company, Wilmington, DE) at a heating rate of 20° C./min. under a nitrogen atmosphere. Measurements were made on the polymer as prepared.

Crystallinity was determined by observing a melting point in the polymer. Accordingly, amorphous character was indicated by a lack of a melting point.

Glass transition temperature (Tg) and melting temperature (Tm) were determined using a model 9900 thermal analyzer. Thermal analysis employed a Differential Scanning Calorimeter (DSC) attachment and a heating rate of 20° C./min. under a nitrogen atmosphere.

Inherent viscosity (IV) was determined with 0.4 weight percent of polymer in a 60/40 weight/weight mixture of phenol and s-tetrachloroethane (TCE) at 30° C. IV is expressed in decaliters per gram (dL/g).

Transparency was determined by visual inspection. Films of polyamide, approximately 5 to 10 mm thick, were examined to determine if shapes were discernable when viewed through the polymer film. Color was not a factor in determining transparency. Therefore, a polyamide film could display a color and still be considered transparent. Examples 1-25 were all transparent.

Neopentyldiamine (NPDA) is commercially available from Aldrich Chemical Company, Milwaukee, Wisc. In addition, the diamine can be made by reacting neopentylglycol with ammonia in the presence of a catalyst, such as a palladiumtriphenylphosphine complex catalyst. A more detailed description of neopentyldiamine preparation methods can be found in DE 3,238,931, DE 2,722,957, and DE 2,358,355, all of which are incorporated herein by reference.

Terephthalic acid (TA), isophthalic acid (IA), and naphthylene dicarboxylic acid are available from Amoco Chemical Company, Chicago, Ill. Terephthaloyl dichloride (TACl), isophthaloyl dichloride (IACl), adipic acid (AA), thionyl chloride, and hexamethylenediamine (HMDA) are available from Aldrich Chemical Company, Milwaukee, Wisc.

The TACl and IACl were vacuum distilled (TACl at 0.200 mm, 96° C.; IACl at 0.065 mm, 82° C.) to increase purity. The NPDA was distilled under nitrogen at 153° C., and the HMDA was vacuum distilled (0.600 mm, 63° C.).

EXAMPLE 1

A TA/IA(40/60)-NPDA/HMDA(50/50) polyamide was prepared by interfacial condensation. A solution of HMDA (5.81 g, 0.05 moles), NPDA (5.11 g, 0.05 moles), and potassium hydroxide (KOH) (11.22 g, 0.20 moles) in 1.0 L $H_2O$ was stirred in a Waring blender. A solution of TACl (8.12 g, 0.04 moles) and IACl (12.18 g, 0.06 moles) in 400 mL of carbon tetrachloride ($CCl_4$) was added, and the blender was run at a high setting until condensation was essentially complete (approximately 1 minute). The resultant solid was collected by filtration and washed in succession with acetone, ethanol, and water by slurrying the solid in these solvents, stirring them in the blender, and then refiltering after each wash. The polymer was placed in a Soxhlet extractor and extracted with hot acetone for 18 hours. The polymer was then dried under vacuum at 100° C. for 4.25 hours. The IV (0.4 g/dL) was determined to be 0.79 dL/g in 60/40 phenol/s-tetrachloroethane at 30° C. The Tg was determined by DSC to be 158.5° C. The polymer was stable to a temperature in excess of 350° C.

In contrast, a 40/60 TA/IA-100% HMDA polymer (see Comparative Example A below) was found to have a Tg of 127° C.

EXAMPLE 2

2,6-naphthoyl dichloride was prepared by reacting 2,6-naphthalene dicarboxylic acid with thionyl chloride to form the dichloride derivative. A solution of NPDA (10.42 g, 0.102 mole), potassium hydroxide (KOH) (12.60 g, 0.225 mole), dodecyl sulfate sodium salt (2.03 g, 0.007 mole), and water (1500 ml) were placed in a blender and stirred at a low shear rate. To this stirred solution was slowly added a solution of 2,6-naphthoyl dichloride (25.03 g, 0.100 mole) dissolved in cyclohexanone (500 ml). An additional 50 mL of cyclohexanone was used to quantitatively rinse the 2,6-naphthoyl dichloride into the blender. The blender was agitated for 3 to 4 minutes at a moderate speed. The polymer was filtered, washed with water, treated with dilute ammonium hydroxide solution, washed with water, and vacuum dried. The polymer had a 0.43 dL/g inherent viscosity and a Tg of 213° C.

EXAMPLE 3

An acid chloride solution was prepared by dissolving TACl (16.24 g, 0.080 moles) and IACl (24.36 g, 0.120 moles) in methyl chloride ($CH_2Cl_2$, 300 mL) in a 500 mL beaker. HMDA (11.86 g, 0.102 moles), NPDA (10.42 g, 0.102 moles) and KOH (25.25 g, 0.450 moles) in 2 L water were placed in a 4 L blender. The blender was started on the low speed, and the acid chloride solution was added. The 500 mL beaker was rinsed with additional $CH_2Cl_2$ (200 ml), and the rinse was added to the blender. The blender was plugged into a variac which reduced the blender speed and insured that the solution did not splash out of the blender when it was started. The lid was secured on the blender, and the speed was increased to a high shear rate and run for about 2 minutes. The resulting polyamide was filtered, and the polymer was returned to the blender. 2 L of water were added, and the blender was run on the high speed for 2-3 minutes before filtering the polymer. This step was repeated two additional times for a total of three washings. The polyamide was then treated with an ammonium hydroxide/water solution (1400 mL water and 600 mL ammonium hydroxide), stirred for 3 hours, filtered, and rinsed with water until the pH was approximately neutral. The polyamide was then dried in a vacuum oven (120° C., 0.05 hrs.). The polymer had a 1.00 dL/g inherent viscosity and a Tg of 147° C.

COMPARATIVE EXAMPLE A

Using appropriate proportions of isophthalic acid, terephthalic acid, and hexamethylenediamine, Comparative Example A was prepared by the general procedure described in Example 3. The thermal properties and inherent viscosity for Comparative Example A are reported in Table II below.

EXAMPLES 4-9

Examples 4-9 were prepared by the general procedure described in Example 3. Stoichiometry of the acid and diamine components are reported in Table I and the thermal properties and inherent viscosities are reported in Table II below.

COMPARATIVE EXAMPLES B-C

Using appropriate proportions of isophthalic acid, terephthalic acid, and hexamethylenediamine, Comparative Examples B-C were prepared by the general procedure described in Example 3. The thermal properties and inherent viscosities for Comparative Examples B-C are reported in Table II below.

| Example Number | Moles TACl/IACl | Moles HMDA/NPDA | Weight (g) TACl/IACl | Weight (g) HMDA/NPDA |
|---|---|---|---|---|
| 4 | .080/.120 | .153/.051 | 16.24/24.36 | 17.78/5.21 |
| 5 | .080/.120 | .051/.153 | 16.24/24.36 | 5.93/15.63 |
| 6 | .080/.120 | .000/.204 | 16.24/24.36 | 0.00/20.84 |
| 7 | .040/.160 | .102/.102 | 8.12/32.48 | 11.86/10.42 |
| 8 | .000/.200 | .102/.102 | 0.00/40.60 | 11.86/10.42 |
| 9 | .120/.080 | .000/.204 | 24.36/16.24 | 0.00/20.84 |
| B | .040/.160 | .204/.000 | 8.12/32.48 | 23.71/0.00 |
| C | .000/.200 | .204/.000 | 0.00/40.60 | 23.71/0.00 |

Thermal properties and inherent viscosities for Examples 3-9 and Comparative Examples A-B are detailed in Table II below.

Table II illustrates that increasing the proportion of NPDA in the polymer composition increases the Tg of the resulting polyamide. The molar ratio of NPDA/HMDA was adjusted from 0/100 NPDA/HMDA to 100/0 NPDA/HMDA, and the molar ratio of TA/IA was held at either 40/60, 20/80, 0/100, or 60/40.

TABLE II

| Example Number | Mole Ratio NPDA/HMDA | Mole Ratio TA/IA | IV dL/g | Tg (°C.) |
|---|---|---|---|---|
| C | 0/100 | 0/100 | 1.41 | 120 |
| A | 0/100 | 40/60 | 1.59 | 127 |
| 4 | 25/75 | 40/60 | 1.18 | 136 |
| 3 | 50/50 | 40/60 | 1.00 | 147 |
| 5 | 75/25 | 40/60 | 1.04 | 170 |
| 6 | 100/0 | 40/60 | 0.86 | 190 |
| B | 0/100 | 20/80 | 1.67 | 127 |
| 7 | 50/50 | 20/80 | 0.98 | 142 |
| 8 | 50/50 | 0/100 | 0.95 | 139 |
| 9 | 100/0 | 60/40 | 0.58 | 190 |

Referring to Comparative Example A and Examples 4, 3, 5, and 6 (reported in Table II), wherein the TA/IA mole ratio was held constant at 40/60 and the NPDA/HMDA ratio was varied from 0/100 (illustrated by Comparative Example A) to 100/0 (illustrated by Example 6), an increase in the molar ratio of NPDA is seen to correspond to an increase in Tg. As the percentage of NPDA increased from 0% to 100%, the Tg of the polyamide increased from 127° C. to 190° C.

EXAMPLES 10-11

Using appropriate proportions of isophthalic acid, terephthalic acid, neopentyldiamine, and hexamethylenediamine, Examples 10-11 were prepared by the general procedure described in Example 3. Example 10 is an IA-NPDA polyamide, and Example 11 is a TA-NPDA polyamide. The thermal properties and inherent viscosities for Examples 10-11 are reported in Table III below.

COMPARATIVE EXAMPLE D

Using appropriate proportions of isophthalic acid, terephthalic acid, and hexamethylenediamine, Comparative Example D was prepared by the general procedure described in Example 3. Comparative Example D is a 60/40 TA/IA-HMDA polyamide. The thermal property for Comparative Example D is reported in Table III below.

TABLE III

| Example Number | Polyamide Thermal Properties | | | |
|---|---|---|---|---|
| | Mole Ratio NPDA/HMDA | Mole Ratio TA/IA | IV dL/g | Tg (°C.) |
| C | 0/100 | 0/100 | 1.41 | 120 |
| B | 0/100 | 20/80 | 1.67 | 127 |
| A | 0/100 | 40/60 | 1.59 | 127 |
| D | 0/100 | 60/40 | — | 128 |
| 8 | 50/50 | 0/100 | 0.95 | 139 |
| 7 | 50/50 | 20/80 | 0.98 | 142 |
| 3 | 50/50 | 40/60 | 1.00 | 147 |
| 10 | 100/0 | 0/100 | 0.70 | 184 |
| 6 | 100/0 | 40/60 | 0.86 | 190 |
| 9 | 100/0 | 60/40 | 0.58 | 190 |
| 11 | 100/0 | 100/0 | 0.61 | 188 |

In Table III, the Examples and Comparative Examples are arranged such that the TA/IA mole ratio is varied and the NPDA/HMDA mole ratio is held constant at either 0/100, 50/50, or 100/0. As can be seen from Table IV, varying the TA/IA ratio had little effect on the Tg compared to the effect of varying the NPDA/HMDA ratio (as seen in Table II).

The TA-NPDA polymer (Example 11) was an amorphous polyamide. In addition, the 40/60 TA/IA-NPDA polymer (Example 6) was an amorphous polyamide.

EXAMPLES 12-14

Using the appropriate proportions of adipic acid, terephthalic acid, neopentyldiamine, and hexamethylenediamine, Examples 12-14 were prepared by the general procedure described in Example 3. The thermal analysis data of these examples are compared in Table IV below.

COMPARATIVE EXAMPLES E-F

Using the appropriate proportions of adipic acid, neopentyldiamine, and hexamethylenediamine, Comparative Examples E-F were prepared by the general procedure described in Example 3. The thermal analysis data and inherent viscosity of these examples are compared in Table IV below.

TABLE IV

| Example Number | POLYAMIDE THERMAL PROPERTIES | | | |
|---|---|---|---|---|
| | Mole Ratio NPDA/HMDA | Mole Ratio TA/AA | IV dL/g | Tg (°C.) |
| E | 50/50 | 0/100 | 1.47 | 58 |
| 12 | 50/50 | 50/50 | 1.34 | 114 |
| 13 | 50/50 | 100/0 | 1.20 | 156 |
| F | 100/0 | 0/100 | 1.05 | 84 |
| 14 | 100/0 | 50/50 | 0.90 | 144 |
| 11 | 100/0 | 100/0 | 0.61 | 188 |

As can be seen from Table IV, increasing the proportion of neopentyldiamine increases the Tg of the resulting polyamide. This is true whether the polyamide is prepared from aromatic diacid (Example 11 compared with Example 13) or whether the polyamide is prepared from aliphatic diacid (Comparative Example F compared with Comparative Example E). However, even the increased Tg of the AA-NPDA polyamide (Comparative Example F) is relatively low. Such a polyamide would not stand up to boiling water in view of its Tg of less than 100° C.

EXAMPLES 15-18

Using appropriate proportions of isophthalic acid, terephthalic acid, neopentyldiamine, and hexamethylenediamine, equal weights of 60/40 TA/IA-NPDA polyamide were prepared as described in Example 3. In this case, a commercially available second polymer (see Tables V and VI) was blended with the amorphous polyamide of the present invention by physically mixing the polymers and vacuum drying the blend at 120° C. for 16 hours. The blends were melt compounded on a twin-screw extruder at 280° C. with a screw speed of 150 rpm. The thermal analysis data and inherent viscosities are reported in Tables V and VI below.

In Example 15, the polymer of the present invention was blended with Nylon 6/6, the polycondensation product of adipic acid and hexamethylenediamine. In Example 16, the polymer of the present invention was blended with Selar PA3426, the polycondensation product of 30/70 TA/IA and hexamethylenediamine. In Example 17, the polymer of the present invention was blended with Trogamid T, the polycondensation product of terephthalic acid and a mixture of 2,2,4-trimethylhexamethylenediamine and 2,4,4-trimethylhexamethylenediamine. In Example 18, the polymer of the present invention was blended with polyethylene terephthalate (PET).

COMPARATIVE EXAMPLES G-J

Comparative Examples G-J were the other polymers that were blended with the polymers of the present invention (the polymer blends are illustrated by Examples 15-18 in Table V). The thermal properties and inherent viscosities for Comparative Examples G-J are reported in Table VI below.

TABLE V

| | 50/50 Blends of 60/40 TA/IA-NPDA Polymer With Other Polymers | | | |
|---|---|---|---|---|
| Example Number | Other Polymer | Blend Tg (°C.) | Blend Tm (°C.) | Blend Composition |
| 15 | Nylon 6/6 | 96 | 252 | miscible |
| 16 | Selar PA3426 | 165 | — | miscible |
| 17 | Trogamid T | 174 | — | miscible |
| 18 | PET | 77(186)* | 249 | immiscible |

*denotes two Tg points

TABLE VI

| | Unblended Polymers | | |
|---|---|---|---|
| Example Number | Other Polymer | Thermal Data Tg (°C.) | Tm (°C.) |
| G | Nylon 6/6 | 43 | 252 |
| H | Selar PA3426 | 123 | — |
| I | Trogamid T | 156 | — |
| J | PET | 72 | 253 |

An immiscible character can be seen in Example 18 (Table V) where two distinct glass transition temperatures were measured. If the polymers had been miscible, one glass transition temperature would have appeared. Therefore, the presence or absence of a second Tg was used as an indicator of the miscability of the blends illustrated in Table V. As can be seen, the polyamide blends (Examples 15-17) were miscible and the polyamide-polyester blend (Example 18) was immiscible.

Further, note that Example 15 retained the crystallinity which was evidenced by the presence of a melting temperature in both the blend (Example 15, Table V) and the pure Nylon 6/6 polyamide (Comparative Example G, Table VI).

In Table VII, the thermal decomposition temperature (Td) (measured by the temperature at 1% weight loss)

of several polyamides of the present invention are compared with other polyamides.

TABLE VII

| Example Number | Polymer | Td* |
|---|---|---|
| 11 | TA-NPDA | 378 |
| I | Trogamid T | 353 |
| 9 | 60/40 TA/IA-NPDA | 369 |
| D | 60/40 TA/IA-HMDA | 354 |
| G | Nylon 6/6 | 350 |

*Temperature (°C.) at 1% Weight Loss

The temperature at which the polymer has lost 1% of its weight is generally considered to coincide with the onset of decomposition. Further, products made from polyamides will exhibit unsatisfactory performance when they are exposed to temperatures above the decomposition temperature. The 1% weight loss temperature also represents a barrier to manufacturing or fabrication procedures since at temperatures above this value, the product will degrade. As can be seen in Table VII, Examples 11 and 9 (illustrating polyamides of the present invention) begin to decompose at a temperature that is higher than that seen in the polyamides of Comparative Examples I, D, and G. Since the polyamides of the present invention maintain their thermal properties at higher temperatures the products made from these polyamides can be used in a higher temperature environment.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure as those skilled in the art will appreciate.

We claim:

1. An amorphous polyamide composition consisting of recurring units corresponding to the following:

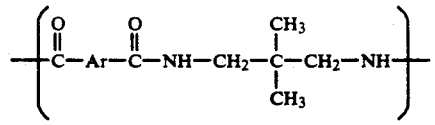

wherein Ar is an aromatic moiety containing from 6 to 10 carbon atoms.

2. The amorphous polyamide composition of claim 1 wherein Ar comprises

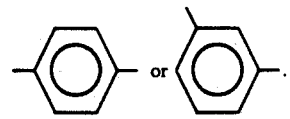

3. The amorphous polyamide composition of claim 1 wherein Ar comprises a mixture of

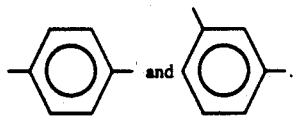

4. The amorphous polyamide composition of claim 1 having an inherent viscosity of at least 0.40 dL/g as determined with 0.40 weight percent of polymer in a 60/40 weight/weight mixture of phenol and p-tetrachloroethane at 30° C.

5. A molded article of the amorphous polyamide of claim 1.

6. A solution of the amorphous polyamide of claim 1.

7. A film of the amorphous polyamide of claim 1.

8. A fiber of the amorphous polyamide of claim 1.

9. A reinforcing fiber of the amorphous polyamide of claim 1.

10. A blend of an amorphous polyamide composition comprising recurring units corresponding to the following:

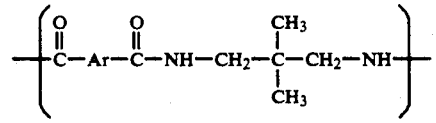

wherein Ar is an aromatic moiety containing from 6 to 10 carbon atoms, and at least one other thermoplastic polymer.

11. The blend of claim 10 wherein the thermoplastic polymer is a polyamide.

12. The blend of claim 10 wherein the thermoplastic polymer is a polyamide selected from the group consisting of the condensation product of hexamethylene diamine and adipic acid; the condensation product of a 30/70 terephthalic acid/isophthalic acid mixture and hexamethylene diamine; and the condensation product of terephthalic acid and a mixture of 2,4,4 trimethylhexamethylene diamine and 2,2,4 hexamethylene diamine.

13. The blend of claim 10 wherein the thermoplastic polymer is the polyamide condensation product of hexamethylene diamine and adipic acid.

* * * * *